J. RUSS.
STONE SAW.
APPLICATION FILED MAY 15, 1915.

1,198,871.

Patented Sept. 19, 1916.

WITNESSES
R A Balderson
H N Corwin

INVENTOR
Jno. Russ

UNITED STATES PATENT OFFICE.

JOHN RUSS, OF LA SALLE, NEW YORK, ASSIGNOR TO THE CARBORUNDUM COMPANY, OF NIAGARA FALLS, NEW YORK, A CORPORATION OF PENNSYLVANIA.

STONE-SAW.

1,198,871.

Specification of Letters Patent.

Patented Sept. 19, 1916.

Application filed May 15, 1915. Serial No. 28,293.

*To all whom it may concern:*

Be it known that I, JOHN RUSS, a citizen of the United States, residing at La Salle, Niagara county, New York, have invented a new and useful Improvement in Stone-Saws, of which the following is a full, clear, and exact description, reference being had to the accompanying drawings, forming part of this specification, in which—

Figure 2:
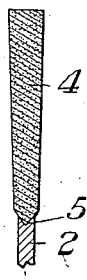
Figure 1:
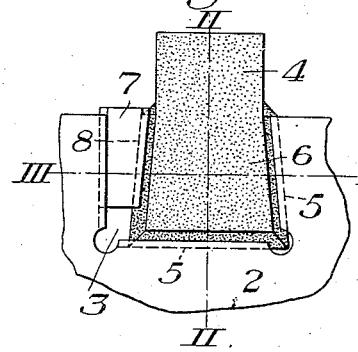
Figure 3:
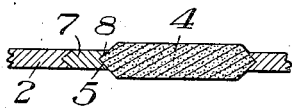
Figure 4:
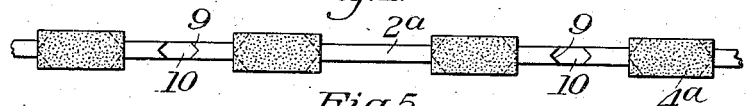
Figure 5:
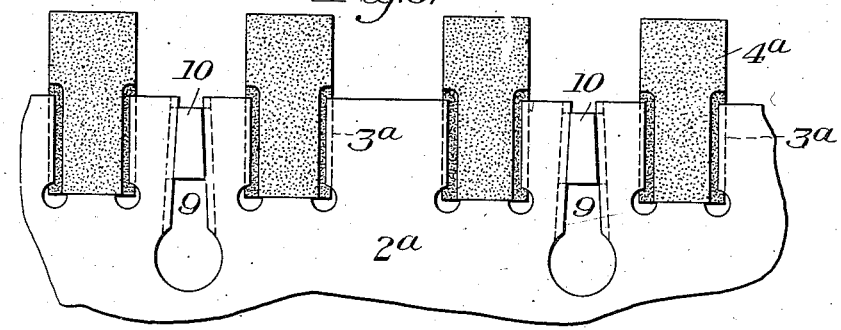
Figure 6:
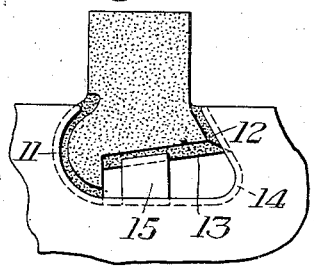
Figure 7:
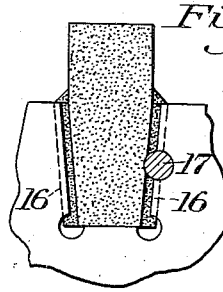

Figure 1 is a side view of a portion of a stone-saw embodying my invention. Figs. 2 and 3 are sections, taken respectively on the lines II—II and III—III of Fig. 1. Figs. 4 and 5 are, respectively, edge and side views illustrating a portion of a stone saw, embodying my invention in a modified form, and Figs. 6 and 7 are views similar to Fig. 1, and showing two other modifications.

My invention has relation to an improvement in stone-saws.

Saws for the cutting of stone having inserted teeth have long been in common use. Heretofore the practice has been to provide insertible teeth of iron or steel, which are fitted into the blade of the saw in suitable sockets and secured by rivets or wedges. On these metal inserts, diamonds are placed in the well known manner. In some cases instead of using diamonds, the inserts have been provided with a cutting element consisting of carborundum grains molded onto the metal piece with a rubber or similar cementing material.

The object of my invention is to do away with the metal insert and to provide a saw having a solid tooth formed of agglomerated carborundum grains, and which tooth combines the functions both of the cutting element and of the attachable metal insert.

I have discovered that if a solid tooth is made with carborundum grains and an elastic bond, such as shellac, such tooth can be successfully wedged in the socket in the saw blade, and when so attached, has no tendency to work loose. In order to accomplish this, the tooth must have elasticity, and it must be placed under some strain when inserted in the blade, so that any slight crushing of the edges engaging the blade, or any tendency to work loose, is quickly followed up with the elasticity of the tooth in its endeavor to resume its normal shape.

An elastic bond of the character described is highly resistant to compression or bending, so that the tooth, while sufficiently compressible to be slightly deformed without rupture when put under strain in its socket, is sufficiently hard and stiff to be firmly gripped by the socket walls and to withstand the stresses incident to sawing stone.

In the accompanying drawings I have shown several embodiments of my invention. Referring first to that form shown in Figs. 1, 2 and 3, the numeral 2 designates a portion of the usual saw blade. This blade is formed with a socket 3 for each tooth 4, the socket being considerably wider than the tooth and having V-shaped grooves 5 along its bottom and at the two sides. One of the side edges of the socket is preferably undercut or dovetailed in form. The tooth 4 is formed with an enlarged base 6 having beveled lateral and bottom edges of double beveled form, and adapted to fit in the V-grooves at the bottom and one edge of the socket. After the tooth is inserted a wedge 7 is seated between the straight edge of the socket and the adjacent edge of the tooth. This wedge has a V-groove 8 at one edge to fit the adjacent beveled edge of the tooth, and a V-bevel at the opposite edge to fit the V-groove in the adjacent edge of the socket, and is driven in tightly until a slight strain is put upon the tooth. The extent of this strain can be readily determined by trial.

In the modification shown in Figs. 4 and 5 the saw blade 2ª is split at intervals between adjacent teeth, as indicated at 9. The sockets 3ª for the teeth have V-grooves in their vertical edges to engage the correspondingly beveled base portions of the teeth; and after the teeth have been inserted in these sockets, wedges 10 are driven in the split portions of the blade, thereby forcing these portions apart and firmly binding the teeth in the sockets.

Fig. 6 shows another modification in which the base of the tooth is shaped to the arc of a circle at one side, as indicated at 11, and the other side has the straight beveled edge portion 12. The base of the tooth is cut away on the under side as shown at 13. The wall of the tooth socket has a continuous V-groove 14. A wedge 15 driven between the bottom of the socket and the upper wall of the cut away portion of the tooth holds the latter firmly in place.

In the form shown in Fig. 7 the tooth is driven in to engage the two grooved sides of the socket 16 and is then held in place by a pin or rivet 17, which is seated partly in the wall of the socket and partly in the tooth, so as to form a key.

Preferably the teeth are made with a taper, as shown in the vertical cross section in Fig. 2, so as to be thickest at its cutting face. This is for the purpose of giving clearance so that the tooth will not bear on the sides of the stone through which the cut is being made. As the tooth wears down there is always a clearance between the stone and the saw.

Teeth in accordance with my invention can be applied to saws of the reciprocating type, to circular saws, or to saws used for coring. I find that the use of these teeth results in great economy, both in the increased life of the teeth and from the increased rapidity of their cutting action. They are very easy to replace, and are much cheaper to produce than either the diamond teeth or the carborundum mounted on a steel back or insert. Teeth made and secured in the manner described also give a much smoother finish than does the diamond saw, thereby requiring less subsequent rubbing of the stone, where a smooth finish is wanted. I do not wish to limit myself to the particular ways of securing the teeth which I have here shown and described, as it is obvious that they may be shaped in various ways and may be wedged in place by various other means within the spirit and scope of the appended claims.

By the term "elastic bond" as used herein and in the appended claims, I refer to a bond having a relatively high elastic limit, and not to a material having a high modulus of elasticity.

I claim:

1. A stone-saw consisting of a blade provided with sockets spaced along its cutting edge, each socket having therein a replaceable tooth consisting of abrasive grains bonded by an elastic and highly resistant bond, each tooth having a portion which directly engages the wall of its socket.

2. A stone-saw consisting of a blade provided with sockets spaced along its cutting edge, each socket having therein a replaceable tooth consisting of abrasive grains bonded by an elastic bond, the sides of each tooth engaging its socket along at least two edges thereof, and wedging means for holding the tooth in the socket under strain.

3. A stone-saw having a replaceable tooth formed of abrasive grains bonded by an elastic bond, and means securing the tooth in the blade and acting to place the tooth under strain.

4. A stone saw tooth, consisting of a shaped body composed of carborundum grains bonded by an elastic and highly resistant bond, each tooth having a portion shaped for direct engagement with a seating socket of a saw blade.

5. A stone saw consisting of a metallic blade provided with sockets along its cutting edge, the walls of which are movable toward each other, teeth replaceably seated in said sockets, each tooth being formed of a molded body of a compressible material having a high elastic limit and composed of abrasive grains bonded by an elastic bond, and means for forcing the tooth-engaging walls of the sockets toward each other to grip and bodily compress the material of the teeth whereby loosening of the teeth is prevented.

6. A stone saw consisting of a metallic blade provided with sockets along its cutting edge, teeth replaceably seated in said sockets, each tooth being formed of a flat comparatively long molded body of a compressible material having a high elastic limit and composed of abrasive grains bonded by an elastic bond, and means for securing each tooth in its socket, and bodily compressing its material to shorten it lengthwise, said teeth because of their high elastic limit tending to resume their original length and maintain a tight fit in the socket under conditions of use.

7. A stone saw consisting of a metallic blade provided with sockets along its cutting edge, teeth replaceably seated in said sockets, each tooth being formed of a molded body of a compressible material having a high elastic limit and composed of abrasive grains bonded by an elastic bond, and means for securing each tooth in its socket and bodily compressing its material whereby loosening of the tooth is prevented.

8. A stone saw consisting of a blade provided with sockets spaced along its cutting edge, each socket having one of its tooth-engaging side walls formed by a flexible tongue integral with the saw blade, teeth replaceably seated in said sockets, each tooth being formed by a molded body of a compressible material having a high elastic limit and composed of abrasive grains bonded by an elastic bond, and means for forcing the tooth-engaging tongue toward the opposite wall of the socket to grip and compress the tooth in the socket.

In testimony whereof, I have hereunto set my hand.

JOHN RUSS.

Witnesses:
O. HUTCHINS,
F. J. TONE.